July 8, 1924.
J. WEBER
WINDOW
Filed Aug. 5, 1920          3 Sheets-Sheet 1
1,500,288
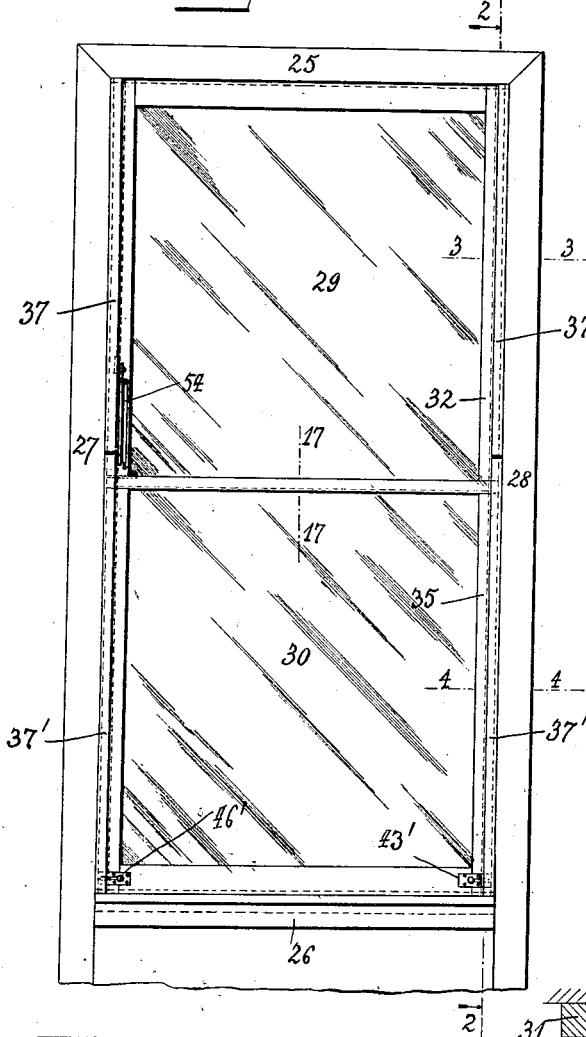
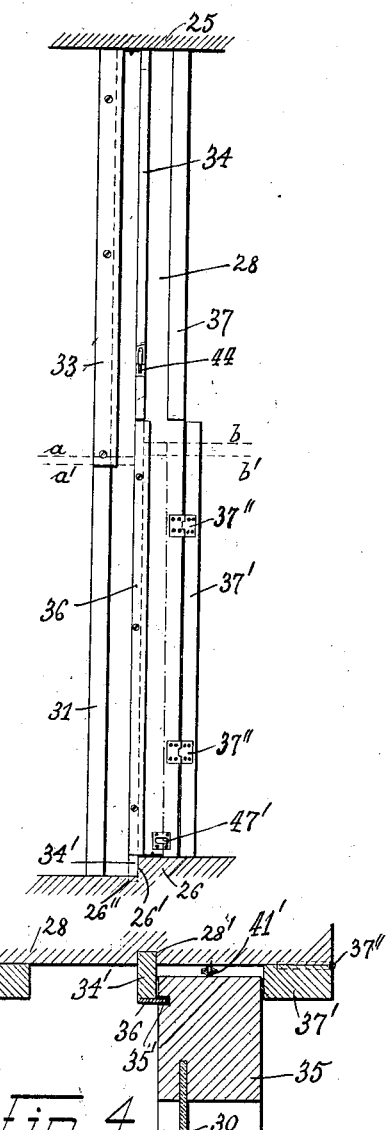
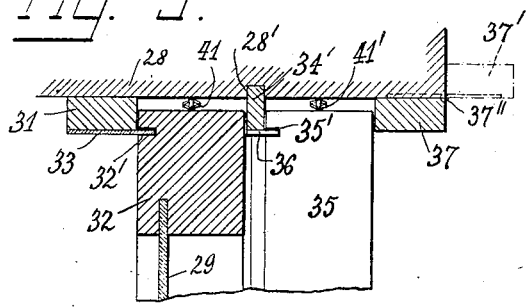
INVENTOR.
Jacob Weber
BY
Richard Geier
ATTORNEYS.

July 8, 1924.
J. WEBER
WINDOW
Filed Aug. 5, 1920        3 Sheets-Sheet 2
1,500,288
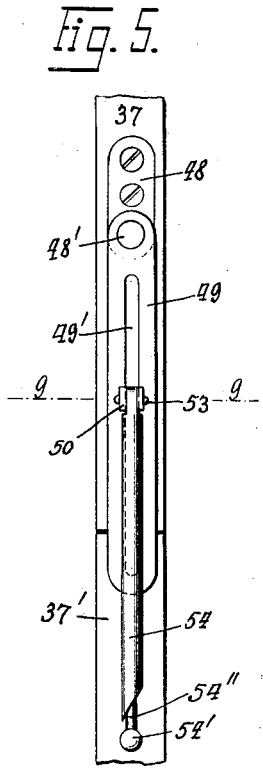
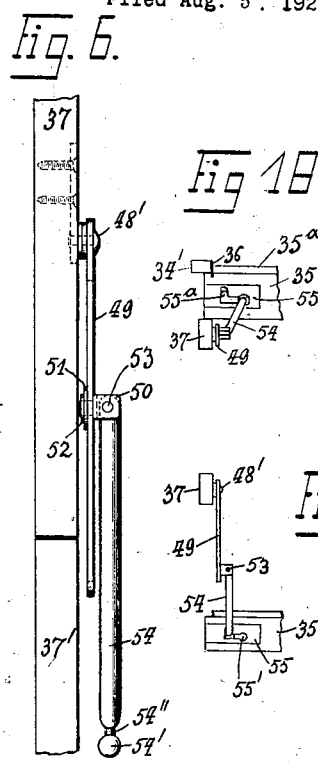
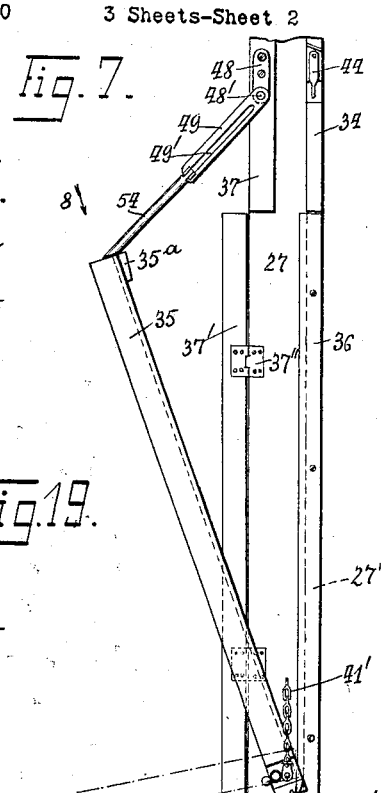
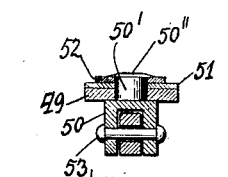
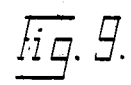
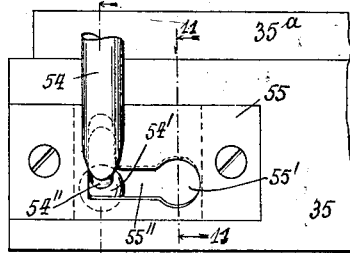
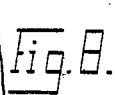
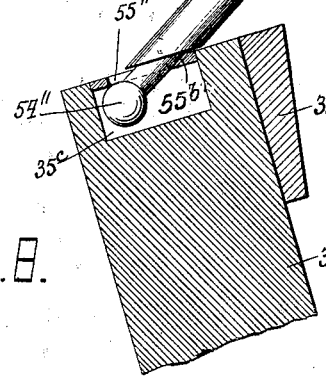
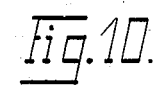
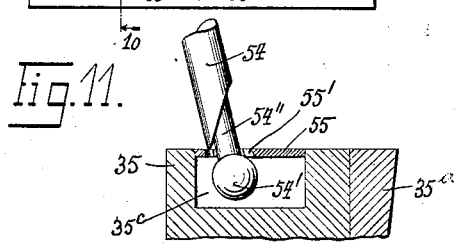
INVENTOR.
Jacob Weber
BY
ATTORNEYS.

July 8, 1924.

J. WEBER

WINDOW

Filed Aug. 5, 1920

1,500,288

3 Sheets-Sheet 3

INVENTOR.
Jacob Weber

BY
Richards Geier
ATTORNEYS.

Patented July 8, 1924.

1,500,288

UNITED STATES PATENT OFFICE.

JACOB WEBER, OF NEW YORK, N. Y.

WINDOW.

Application filed August 5, 1920. Serial No. 401,372.

*To all whom it may concern:*

Be it known that I, JACOB WEBER, a citizen of the Republic of Germany, residing at New York, county of New York, and State of New York, have invented certain new and useful Improvements in Windows, of which the following is a specification.

My present invention relates to windows of the sliding sash type and has for its principal object to provide an improved construction in which either or both the sashes may be swung into the room and quickly and easily reversed and immediately placed back in position in the window frame to enable the outer sides of the glass to be cleaned by a person standing within the room, thus avoiding the necessity for the worker leaning out the window or standing upon the sill, and further insuring that the window space will be entirely closed during the entire cleaning operation.

A further object of the invention is to provide for swinging the lower sash into an inclined ventilating position, the angle of which may be varied within certain limits thereby preventing drafts and another object is to provide the window with means to insure weather tight joints. Other objects of the invention will be in part obvious and will appear more fully as the description proceeds.

A satisfactory and typical form of my invention is shown in the accompanying drawings, but I desire it to be understood that various modifications may be made without departing from the spirit of the invention as set forth in the appended claims, and further, that all the features illustrated need not be present jointly in order to secure certain of the advantages of the invention.

Figure 12:
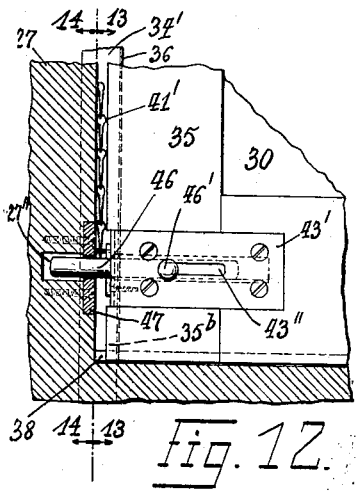
Figures 13, 14:
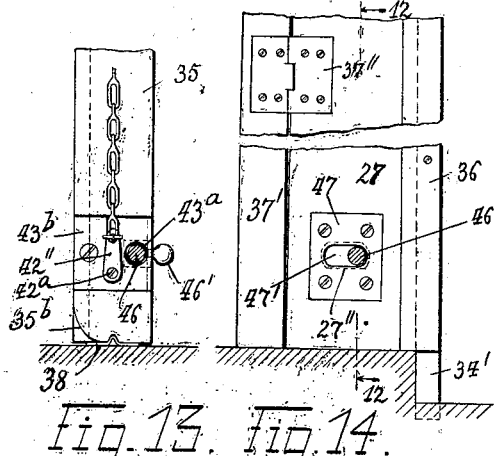
Figure 15:
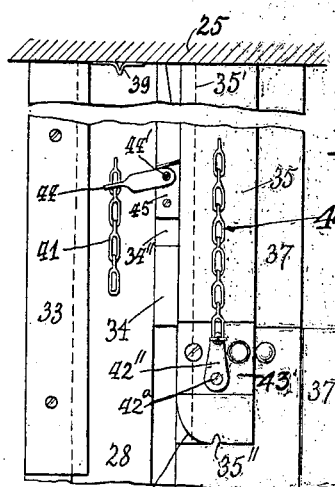
Figure 16:
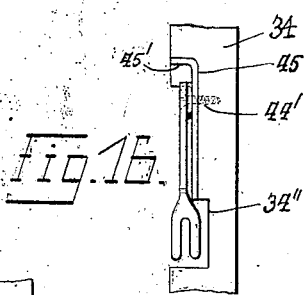
Figure 17:
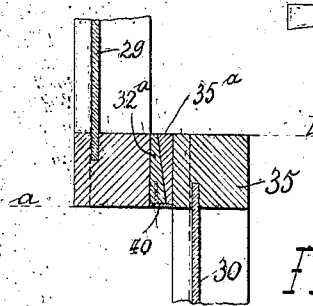

In the said drawings Fig. 1 is an elevation of a window embodying my present improvements, viewed from the inside, and showing the window closed; Fig. 2 is a side view showing one of the sides of the window frame in elevation, and its top and bottom in section on line 2—2 of Fig. 1 the sashes being omitted from the view; Figs. 3 and 4 are partial horizontal sections on the lines 3—3 and 4—4 respectively of Fig. 1; Figs. 5 and 6 show upon an enlarged scale, in side elevation and front elevation respectively, a portion of the window frame and the device for holding the lower sash in an inclined position for ventilation, these two views illustrating said device in its normal or disconnected condition; Fig. 7 is a partial side elevation showing the lower sash held in its inclined position; Fig. 8 is a partial view from above, in the direction of the arrow 8 in Fig. 7; Fig. 9 is a horizontal section on line 9—9 of Fig. 5; Fig. 10 is an enlarged vertical section on line 10—10 of Fig. 8; Fig. 11 is a cross section of a portion of the lower sash, on the plane indicated at 11—11 in Fig. 8, but showing the sash in its normal vertical position, and the holding device in the position it takes initially when placed in connection with the sash; Fig. 12 is a view showing a lower corner of the lower sash in front elevation, and the adjacent portion of the window frame in section, substantially on line 12—12 of Fig. 14; Figs. 13 and 14 are sections taken in the same plane, perpendicular to Fig. 12, but looking in opposite directions, as indicated at 13—13 and 14—14 respectively in Fig. 12; Fig. 15 is a side elevation with parts in section and other parts broken away, illustrating particularly the manner of swinging the upper sash inwardly; Fig. 16 is a detail front elevation showing a hook for temporarily holding the chain of the upper sash, and the support of said hook; Fig. 17 is a partial vertical section on line 17—17 of Fig. 1; Fig. 18 is a partial diagrammatic top view showing the lower sash in its vertical position and the holding device in its position of initial engagement, as in Fig. 11; and Fig. 19 is a corresponding top view showing the sash swung to an inclined position such as indicated in Fig. 7.

Referring particularly to Figs. 1 and 2, the window comprises a frame having a top member 25, a bottom member 26, and side members 27, 28. Each of these side members is provided, on the side facing the companion side member, with guide strips for the vertically-sliding upper sash 29 and lower sash 30. In detail, these guide strips are constructed as follows: At the outer side of the window is located a guide strip 31 extending the full height of the window and engaging the adjacent side member 32 of the frame of the upper sash, at the outer face of said member 32. At its upper portion, engaging the frame of the upper sash in its raised position, the strip 31 is provided with a plate or strip 33 the inner edge of which projects from the strip 31 into a vertical groove 32′ in the outer face of the side member 32 (Fig. 3). In Fig. 2, the line $a$ indicates the level at which the bottom edge of the upper sash frame stands when this sash is in its fully raised position, while the line $b$ indicates the level of the upper edge of the lower sash frame when in its fully lowered position (see also Fig. 17). The plates or strips 33, which may be made of galvanized iron or other suitable material, by projecting into the grooves 32′ assist in obtaining an air-tight fit, and also hold the upper sash against lateral movement, Fig. 3 showing that the side members 32 of the upper sash frame do not normally engage the side members 27, 28 of the window frame. On its inner face, each side member 32 of the upper sash frame engages a guide strip or parting strip made of like superposed sections 34, 34′ fitted in a groove of the corresponding stationary member 27 or 28, as indicated at 28′ in Fig. 3 or 27′ in Fig. 7, said strip 34, 34′ at the same time forming a guide for the outer face of the lower sash 30, the frame 35 of which is provided with a vertical groove 35′ in its outer face to receive an inwardly-projecting plate or strip 36 similar in function to the strip 33, but located at the lower portion of the window, and fastened to the lower section 34′ of the parting strip. The sections 34′ of the two parting strips are held in the grooves of the side members 27 and 28 simply by friction, so that these lower sections, with the plates 36, can be removed readily by an inward movement, under conditions to be set forth below. The strips 31 with their plates 33, and the upper sections 34 of the parting strip, are however connected with the window frame permanently, and are not disturbed except for repairs. The inner face of the lower sash frame 35 is engaged by guide strips comprising fixed upper sections 37, the lower ends of which are at the same level as the lower ends of the strip sections 34, and movable lower sections 37′ which in the specific arrangement shown swing on vertical hinges 37″ and are normally in line with the upper sections 37, as in Fig. 1, or may be turned through an angle of about 180° to the position indicated by dotted lines in Fig. 3 and by full lines in Figs. 2, 7, 14 and 15, this having practically the same effect as if said sections 37′ were removed, and in this position the sections 37′ leave a clear passage for a swinging movement of either sash, as will be explained below.

The bottom member 26 of the window frame is provided, in the path of the lower sash, with a weather strip 38 made of sheet metal and formed with a ridge in the shape of an inverted V, which is adapted to fit into a corresponding horizontal groove 35″ at the bottom of the lower sash frame 35 when the latter is lowered fully. A similar strip 39 with a V-shaped ridge, is provided on the top member 25 of the window frame in the path of the upper sash, to fit into a horizontal groove 32″ at the top of the frame of said sash, when the latter is fully raised. These strips 38, 39 not only guard against the entrance of dust, rain, etc., but also, by forming a tortuous path, make it much more difficult for air to blow in between the sashes and the members 25, 26, and so these strips produce practically air-tight joints, or at least prevent drafts. For the purpose of making a tight joint at the meeting point of the two sashes, in the closed position of the window, the top bar of the lower sash frame 35 may be made with a meeting rail 35$^a$ having an outer surface inclined downwardly and inwardly and adapted for engagement with the correspondingly inclined inner surface of the meeting rail 32$^a$ at the bottom of the frame of the upper sash 29. To the lower end of said rail 32$^a$ I prefer to secure a metal strip 40, projecting inwardly and adapted to engage the lower surface of the rail 35$^a$, said strip thus covering the joint of the two meeting rails and impeding, if not entirely preventing the passage of air therethrough when the window is closed, see Fig. 17.

The upper portions of the chains or like flexible members 41 (Fig. 15) for the upper sash are connected in any customary or approved manner with the sash weights (not shown), said chains passing in the spaces left between the side members 32 of the sash frame and the side members 27, 28 of the window frame, see Fig. 3. The lower ends of said chains 41 are secured to the outer ends of arm 42 which are pivoted at 42′ to plates 43 secured to the lower portions of the side members 32. Each of the chains 41 is adapted to be engaged at times, as explained below, by a forked hook or catch 44 pivoted at 44′ to a plate 45 set within a small recess of the upper section 34 of the respective parting strip, said recess having an enlargement 34″ to receive the forked end of the hook 44 when the latter is in its normal, inactive, vertical position shown in Figs. 2 and 16. When the hook 44 is swung into engagement with the chain 41 as indicated in Fig. 15, it engages a stop 45′, preferably inclined, formed at the upper end of the plate 45.

The lower member 26 of the window frame is formed with a step 26′ as shown in Figs. 2 and 15, so that the slideway of the upper sash extends downwardly slightly beyond the slideway of the lower sash, the outer guide strip 31 and the parting strip 34, 34′ being slightly longer than the inner guide strip 37, 37′. The plate or strip 36, however, is of the same length as the inner strip section 37′, so that the parting strip section 34' projects downwardly beyond said plate 36, as shown in Fig. 2. Preferably, the parting strip section 34' extends slightly below the outer strip 31, the bottom member 26 having a recess 26" at each side forming a continuation of the respective side groove, as indicated for the groove 28' in Fig. 15. The hinged sections 37' may be held in their normal position (Fig. 4) by screws or other suitable means (not shown).

When it is desired to swing the upper sash 29 into the room or building, so that the outer surface of the pane may be cleaned readily and without danger, the hinged sections 37' of the inner guides are swung to the position shown in Figs. 2, 14 and 15 (see also dotted lines in Fig. 3), the lower sash 30 being raised to the top, as indicated in Fig. 15. In Fig. 2, $b'$ indicates the level of the bottom of the lower sash when thus raised. Then the lower sections 34' of the two parting strips, with their plates 36, are removed from the grooves 28', preferably by using the lower end of each section 34' as a temporary fulcrum on which said section is swung laterally, that is, toward the companion section. Thereupon the upper sash is lowered fully, so that its bottom will enter the extension or depression to the left of the step 26' shown in Figs. 2 and 15, and this will bring the upper edge of the upper sash to the level indicated at $a'$ in Fig. 2. The hooks or catches 44 are then engaged with the chains 41 as in Fig. 15 if it is desired to hold the sash in a horizontal position, so that the sash weight will not be able to move the chains when the upper sash is tilted to the position shown in Fig. 15. During the tilting movement, the arms 42 remain vertical, owing to their pivotal connection at 42', and the sash is supported partly by such pivotal connections and the weather strip 38 forming a fulcrum, and partly by the hand of the cleaner or other operator grasping what is normally the upper portion of the sash. For cleaning the window in cold weather when it is not desirable to have the window left open the catches 44 are not engaged with the chains, and the upper sash being lowered, after the sections 34' have been removed and the hinged sections 37' swung upon their pivots, is swung back into the room, by the operator grasping the upper side of the sash. As part of the weight of the sash is supported by the operator, the chains 41 actuated by the sash weights will raise the lower end of the sash vertically and with a very slight effort on the part of the operator the sash is returned to the frame in an inverted position, the lower end of the sash now being on top and the upper end on the bottom, with the outer side of the glass now turned towards the room. It is obvious that the sash can be adjusted to entirely close the portion of the opening below the plates 33, while in the reversed position. The lower sash can also be reversed in a similar manner after swinging the sections 37' to their open position and either sash may be reversed in position without reversing the other.

The lower sash 30 is connected at its lower portion with the chains 41', secured to the arms 42" pivoted at 42$^a$ to plates 43' which are secured to the sides of the sash frame 35. Hooks or catches such as 44 are not used in conjunction with the chains 41' of the lower sash, but the following construction is provided to enable the lower sash to swing about its lower portion and to prevent the sash weights from having an objectionable action on the lower sash as the latter is tilted. The front or inner member of each of the L-shaped plates 43' has a horizontal or transverse slot 43" through which passes the knob or handle 46' of a bolt 46 sliding laterally through a suitable opening 43$^a$ in the side or end member 43$^b$ of the plate 43'. The side members 27 and 28 of the window frame are provided with recesses such as 27" in Figs. 12 and 14, which are elongated horizontally in a direction perpendicular to the planes of the sashes. The ends of the recesses facing the sash guideways, are covered by the plates 47 having horizontal slots 47' corresponding to the direction of said recesses, and adapted to receive the sliding bolts 46, see Figs. 12 and 14.

To swing the lower sash 30 inward for cleaning or other purposes, (see Fig. 7), said sash is lowered to the bottom of its guideway, thus bringing the bolts 46 in register with the openings or slots 47'. Normally, the said bolts are retracted into the sash, as indicated in Fig. 1. By projecting the bolts 46 into the recesses such as 27", a connection is effected between the sash and the window frame which prevents upward movement of the sash, but allows the lower end of the sash to move inwardly or outwardly within the limits of the slots 47' and recesses such as 27", and also allows the sash to swing about a horizontal axis formed by the two aligning bolts 46 if the guide strip sections 37' have been swung open. When the sash 30 is swung down fully about this axis, as indicated by dotted lines in Fig. 7, the outer surface of its pane is presented upwardly within the room or building, and may therefore be cleaned readily without any danger to the person doing this work. In order that the outer lower corners of the sash frame 35, where it engages the sections 34' of the parting strip may turn readily, I prefer to round them as indicated at 35$^b$ (Figs. 12 and 14), but there is no need of so rounding that portion of the lower edge of said frame which lies between the two grooves 35' and does not engage the strip sections 34'. It will be noted from Figs. 12 and 13 that owing to the interposition of the weather strip 38, the sash frame 35 does not come into direct engagement with the bottom member 26 of the window frame and as the pivot bolt 46 is located to one side of the vertical center of the sash and approximately in the same vertical plane as the inner end of weather strip 38, that sufficient play is left for the swinging of the inner lower corner of said sash frame under the pivot or fulcrum 46, as indicated in Fig. 7.

Instead of swinging the upper sash 29 inward in its lowermost position, with the lower sash 30 raised fully, as described hereinbefore, I may also first swing the lower sash to the position indicated by dotted lines in Fig. 7, and then (having removed the parting strip sections 34') bring the upper sash down until its upper edge is practically clear of the upper strip sections 34 and 37, whereupon, after fastening the chains 41 to the hooks 44, the upper sash may be swung inwardly in a manner similar to that described above, but in this case the upper sash will lie on top of the lower sash instead of engaging the weather strip 38 as in Fig. 15. This alternative manner of tilting the upper sash into an approximately horizontal position within the room, does not require the lower member 26 to be made with a step such as 26', and is therefore applicable even in cases where the invention is applied to existing windows the frame of which has its lower member made without such step.

In many cases, it is desired to swing the lower sash 30 inwardly only to a slight extent, say no more than indicated by full lines in Fig. 7, for the purpose of ventilation. In order to limit the opening movement for ventilation, and to firmly hold the sash in the ventilating position, I have provided the following device, which is shown only at one side of the window, although it might be applied at both sides. To the lower portion of the upper section 37 of the inner guide strip is secured a plate 48 to which a link 49 is pivoted about a horizontal transverse axis 48' parallel to the bolts 46. This link has a longitudinal slot 49' in which is adapted to slide a shank or pivot 50', parallel to the axis 48', and integral with a forked slide 50 engaging one face of said link. The other face of the link is engaged by a spring washer 51 (say of the well-known split character) surrounding the shank or pivot 50', the latter having a rivet head 50'', and preferably an ordinary washer 52 is interposed between the spring washer 51 and the rivet head 50''. The fork members of the slide 50 carry a pivot pin 53, arranged in a plane perpendicular to the axis of the pivot 50', and preferably, as shown, the axis of the pin 53 intersects that of the pivot 50'. On the pin 53 is mounted to swing another link 54, having at its free end an enlargement 54', say a ball, and adjacent thereto a portion 54'' thinner than said enlargement, so that a shoulder is formed on the same end of the link 54 opposite the enlargement 54'. The parts 49 to 54 inclusive normally hang loose from the pivot 48' in a vertical position, as indicated in Figs. 1, 5, and 6, but may be connected with the lower sash in the manner illustrated by Figs. 7, 8, 10, 11, 18 and 19, as follows: The frame 35 of the lower sash is provided in its upper member with a recess 35$^c$ closed at the top by a plate 55 having a transverse slot of key-hole character, one end 55' of said slot being enlarged to allow the ball 54' to be inserted under certain conditions, while the narrow portion 55'' of the slot extends transversely. At the other end, the slot has a lateral extension 55$^a$, Figure 18 directed toward the outside of the room or building. The outer edge of said extension is beveled, as shown best at 55$^b$ in Fig. 10, corresponding to the angular position of the portion 54'' when the parts are in the locked position, Figs. 7, 8, 10, and 19. Both the inner and the outer edges of the slot portions 55' and 55'' are inclined or beveled so as to be parallel to the longitudinal axis of the link 54 when the same is in the position shown in Figs. 11 and 18, for a purpose to be stated presently.

The operation of these parts is as follows: The lower sash 30 being vertical, in its lowermost position, (Figs. 1, 11 and 18), the ball 54' is introduced into the recess 35$^c$ through the round end 55' of the keyhole slot, see Figs. 11 and 18, the inclination of the two longitudinal (inner and outer) edges of the slot being such that the ball can be introduced (and conversely, removed) only when the sash is in a vertical position. The pivots 50', 53 form a universal joint connecting the links 49, 54, and this, in connection with the additional pivot at 48', allows the link 54 to assume any position required. After the ball 54' has been placed in the recess 35$^c$ as described, the sash may be swung inward, pivoting on its lower end, without any possibility of the locking link becoming disengaged, since even a very slight turning of the sash relatively to the link 54 will cause the beveled edges of the slot 55', 55'' to be no longer parallel to the longitudinal axis of the link, so that the link can no longer be disengaged from the plate 55, even if the ball 54' should still be within the enlarged end 55'. Generally, howeved, before the sash is swung open, the link 54 will be swung on the pivot 53 from the position indicated in Figs. 11 and 18, to a position in which the ball 54' lies at the other end of the narrow slot portion 55″. The sash can then be swung open to any extent, up to the maximum angle (Figs. 7, 8, 10 and 19) obtained when the slide 50 reaches the limit of its movement away from the fulcrum 48′. The spring washer 51 will hold the slide 50 with sufficient friction to prevent any accidental movement, and, as stated above, the sash cannot drop accidentally, for the reason that the locking or supporting device cannot be disconnected from the sash frame 35 until the latter is swung back to a vertical position. It is therefore impossible for burglars finding the window in an open inclined position as shown in Fig. 7 to reach in through the opening and disconnect the bar 54.

While I have described the slide 50 as connected pivotally with the link 49 by means of the pin 50′, such pivotal mobility might be dispensed with, the two pivots 48′ and 53 being sufficient to provide the universal mobility of the free end of the link 54 required for the operation set forth above.

Figs. 8 and 18 also indicate that the meeting rail 35ᵃ is narrower than the sash frame 35, so that it may fit between the two removable lower sections 34′ of the parting strips and hold the upper ends of these sections in position in the grooves 27′, 28′, while the lower ends of said sections 34′ are held in the sockets 26″. It will be understood that the meeting rail 32ᵃ is of the same width as the meeting rail 35ᵃ and likewise fits between the sections 34′ of the two parting strips to hold them in position properly. This arrangement also insures an air-tight or at least wind-proof joint between the sashes (and particularly their meeting rails) and the parting strips.

I claim as my invention.

1. In a window, a frame, a sash, means to suspend said sash from said frame for free vertical movement, said sash provided with normally inactive pivot bolts at its sides, and said frame provided with elongated sockets with which said bolts are brought into alignment when said sash is brought to its lowermost position, said bolts and sockets located at one side of the central vertical plane of the sash whereby when said bolts are projected into said sockets a pivotal connection between said sash and frame is effected, said bolts being transversely movable in said sockets and the place of said connection being located to provide clearance between the lower edge of the sash and the frame during the pivotal movement thereof and said bolts being mounted for free slidable movement into said sockets.

2. In a window, two members consisting of a frame, and a sash, means to suspend said sash from said frame for free vertical movement, two pairs of devices located on opposite sides of the sash and frame, each of said pairs comprising a normally inactive pivot bolt freely mounted for slidable movement on one of said members, and a bolt receiving socket on the other of said members, said bolts and sockets adapted to be brought into alignment when said sash is moved to its lowermost position, said bolts and sockets located on one side of the central vertical plane of the sash whereby when said bolts are projected into said sockets a pivotal connection between said sash and frame is effected, said bolts being transversely movable in said sockets and the place of said connection being located to provide a clearance between the lower edge of the sash and the frame during the pivotal movement of the sash.

3. In a window, two members consisting of a sash and a frame, means to suspend said sash from said frame for free sliding vertical movement, sets of means mounted upon each of the opposite sides of said window for pivotally securing said sash against vertical movement, said means comprising a normally inactive pivot bolt freely mounted on one of said members for lateral movement thereof, and a horizontally elongated slot in the other of said members into which said bolt is adapted to be projected, said bolts and slots being so located that they will be brought into alignment when said sash is moved to its lowermost position.

4. In a window, two members consisting of a frame, and a sash, means to suspend said sash from said frame for free vertical movement, two devices located on opposite sides of the sash and frame, each of said devices comprising a normally inactive pivot bolt freely mounted for slidable movement on one of said members, and a bolt receiving socket on the other of said members, said bolts and sockets adapted to be brought into alignment when said sash is moved to its lowermost position, said bolts and sockets located on one side of the central vertical plane of the sash, said bolts when projected into said sockets providing a pivotal connection between said sash and frame, and said socket being horizontally elongated whereby a limited horizontal movement of said sash is permitted to increase the clearance between the lower edge of said sash and said frame when said sash is swung inwardly upon said pivotal connection.

5. The combination with a window having a frame, provided with sash guides, a sash mounted for free vertical movement within said guides, means to counterbalance said sash, flexible connections between said sash and counterbalancing means, said sash and frame constructed and arranged to permit pivotal movement of said sash about a horizontal axis, of means pivotally secured to said frame and movable into the normal path of movement of said sash to directly engage said flexible connections and prevent vertical movement of said sash by the counterbalancing means when the sash is pivoted about said horizontal axis.

6. The combination with a window having a frame, provided with sash guides, a sash mounted for free vertical movement within said guides, means to counterbalance said sash, flexible connection between said sash and counterbalancing means, said sash and frame constructed and arranged to permit pivotal movement of said sash about a horizontal axis, of catches pivoted to the opposite sides of said frame and movable into said sash guides adapted to engage said flexible connections and prevent vertical movement of said sash by the counterbalancing means when the sash is pivoted about said horizontal axis.

7. In a window, upper and lower vertically movable freely suspended sashes, chains attached to the lower extremities of said sashes, a frame, guide means for said sashes, comprising inner and outer guide strips and a parting strip, the lower portions only of said inner guide strip and parting strip being movable, whereby said lower sash may be pivotally swung upon its chains, reversed and replaced in the frame and retained therein in an operative condition, and the guide means for said upper sash extending downwardly below the guide means for said lower sash sufficiently to permit the upper sash to be swung upon its chains and reversed while the lower sash is in its upper position thereby permitting both sashes to be held within the frame in a reversed upright position to enable the outer sides of the sashes to be cleaned while the window opening is substantially entirely closed.

8. In a window, a frame, a sash, means to pivotally connect said sash to said frame, and means engageable with and disengageable from said sash adapted to hold said sash in an inclined position with respect to said frame, the second mentioned means being disengageable from said sash only when said sash is in a substantially vertical position.

9. In a window, a sash, means to pivotally connect said sash to said frame, and adjustable means engageable with and disengageable from said sash adapted to hold said sash in a plurality of inclined positions with respect to said frame, the second mentioned means being disengageable from said sash only when said sash is in a substantially vertical position.

In testimony whereof I have affixed my signature.

JACOB WEBER.